Patented July 24, 1923.

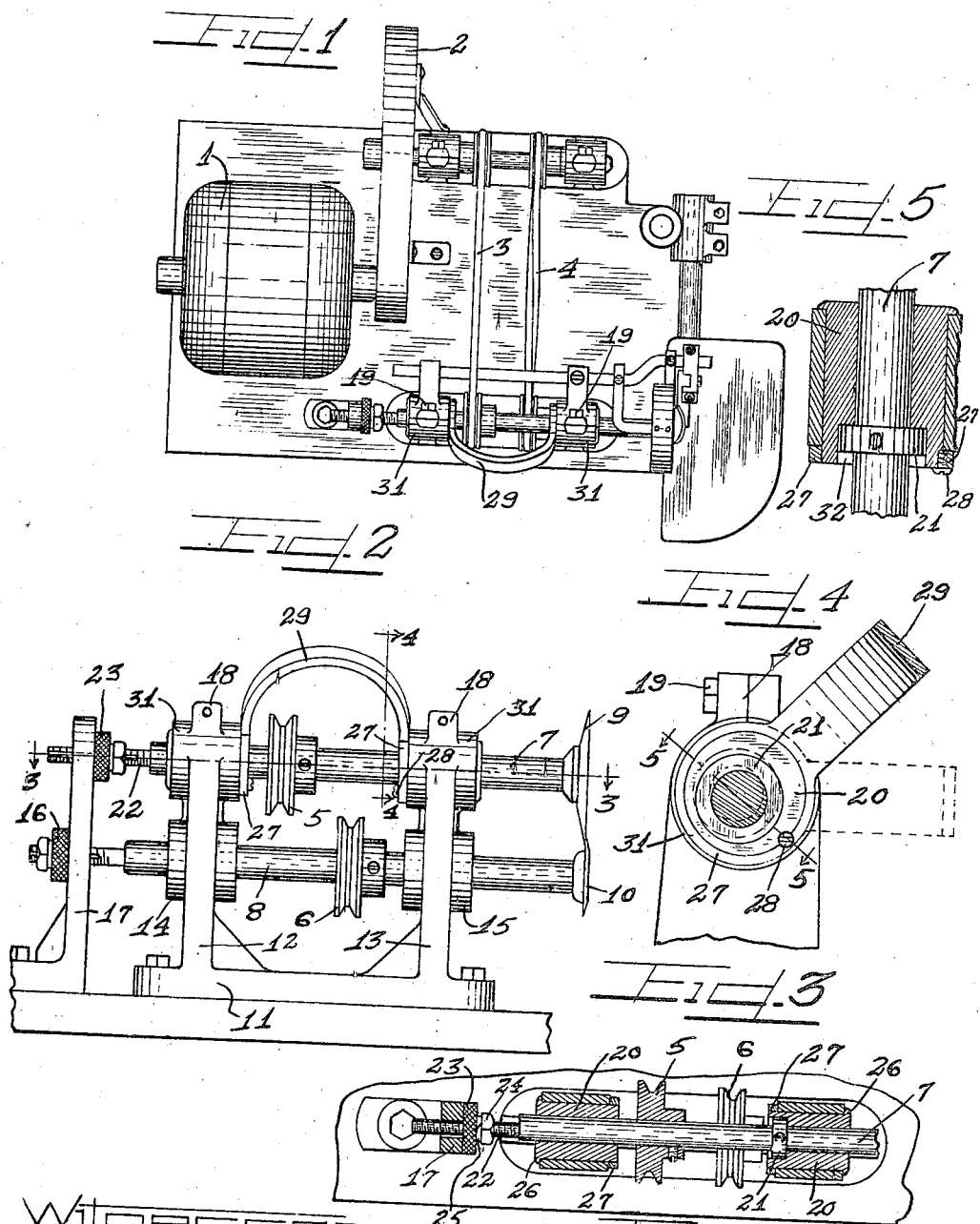

1,462,478

UNITED STATES PATENT OFFICE.

REES BEYNON AND JOHN C. HINTZ, OF CHICAGO, ILLINOIS, ASSIGNORS TO DRYDEN RUBBER COMPANY, A CORPORATION OF ILLINOIS.

ADJUSTING MECHANISM FOR TRIMMERS.

Application filed January 16, 1922. Serial No. 529,507.

*To all whom it may concern:*

Be it known that we, REES BEYNON and JOHN C. HINTZ, citizens of the United States, and residents of the city of Chicago, in the county of Cook and State of Illinois, have invented certain new and useful Improvements in Adjusting Mechanism for Trimmers; and we do hereby declare that the following is a full, clear, and exact description of the same, reference being had to the accompanying drawings, and to the numerals of reference marked thereon, which form a part of this specification.

It is an object of this invention to prepare an adjusting mechanism for regulating the distance apart of two parallel shafts without destroying the parallelism.

It is a further object of this invention to provide a means whereby such an adjustment may be made with great nicety and convenience.

It is a further object of this invention to rigidly connect two eccentric bushings so that they may be always moved together.

It is a further object of this invention to provide a means for adjusting the overlap of the cutting disks in a machine for trimming molded rubber articles.

Other and further important objects of this invention will be apparent from the disclosures in the drawings and the specification.

The invention (in a preferred form) is illustrated in the drawings and hereinafter more fully described.

On the drawings:

Figure 1 is a plan view of a trimming machine.

Figure 2 is a side view of the bearings with the shafts mounted therein.

Figure 3 is a section upon the line 3—3 of Figure 2.

Figure 4 is a section upon the line 4—4 of Figure 2.

Figure 5 is a section upon the line 5—5 of Figure 4.

As shown on the drawings:

The trimmer machine is driven by a motor 1 through reduction gearing housed in the gear case 2 and driving two belts 3 and 4, one of which is open and the other crossed. These belts drive pulleys 5 and 6 mounted on shafts 7 and 8 respectively. At the ends of these shafts are cutting disks 9 and 10 and the degree of overlap of these disks is regulated by adjusting the shaft 7 in the way which will be described.

The shafts are supported from a supplemental plate 11 bolted to the base plate of the machine. Two substantial uprights 12 and 13 rise from this base plate and are provided with lower bearings 14 and 15 in which the shaft 8 is mounted in any usual or suitable way. At the end of the shaft opposite the cutter disk 10 there is the usual provision 16 for endwise adjustment of the shaft. This provision includes a screw passing through an upright 17, which is provided with a foot bolted to the base plate of the machine in line with the supplemental plate 11.

The upper shaft 7 is mounted in bearings 31 in the uprights 12 and 15. These bearings are split as shown at 18 so that by means of the bolts 19 they may be tightened. Each of these bearings holds a sleeve 20 in which the shaft 7 is eccentrically mounted. The bearings 31 are carefully cylindrical and their axes are in the same straight line. The sleeves 20 have cylindrical exterior surfaces which fit the cylindrical bearings 31. The interior surfaces of the sleeves, that is their bores, are also truly cylindrical and in alignment but the line containing their axes is not the same as that containing the axes of the bearings 31.

By rotating the sleeve 20 the height of the shaft 7 may be altered and when the sleeves have been properly positioned they may be held in place by tightening the bolts 19 to draw the sides of the split bearings 31 together. A collar 21 is secured to the shaft 7 by a set screw in the usual way and a recess 32 is provided in the sleeve 20 nearest the cutter disk 9 for the reception of this collar. To hold the shaft 7 in position so that the collar shall remain against the sleeve 20, the end thrust screw 22 is provided which passes through the upright 17 and is adjusted by the knurled nut 23. A lock nut 24 and a split washer 25 are provided to maintain the adjustment when it has been secured. The sleeves 20 are provided with flanges 26 upon their ends which are farthest apart. These flanges bear against the edge of the bearings 31 in which the sleeves are mounted. Motion of the sleeves 20 toward one another is thus prevented. Motion of these sleeves away from one another is prevented by two annular portions 27 of a connecting bail 29. These annular portions surround the sleeves at their nearer ends and are secured thereto by screws 28, the bail or handle 29 being integral with each of them. It is made in the shape of a bail in order to provide room for the pulley 5 and also to provide the necessary leverage for nice or convenient adjustment of the sleeves 20.

The operation of the device:

When it is necessary to adjust the overlap of the disk cutters 9 and 10, the bolts 19 are loosened so that the sleeves 20 are rotatable in their bearings. The handle 29 is then grasped and moved until the overlap of the disks 9 and 10 is as desired. Since the bearings containing the sleeves 20 are in alignment and the bores of the sleeves 20 are also in alignment, the fact that the two sleeves are rigidly connected and rotate together makes the bores of the sleeves always stay in alignment and makes the elevation or depression of one end of the shaft 7 equal to that of the other end so that the parallelism between the shafts 7 and 8 is maintained. As soon as the proper degree of overlap between the disks 9 and 10 is obtained, the bolts 19 are tightened again and the adjustment is completed.

We are aware that many changes may be made and numerous details of construction may be varied through a wide range without departing from the principles of this invention, and we therefore do not purpose limiting the patent granted otherwise than necessitated by the prior art.

We claim as our invention:

In a trimming machine two overlapping cutting disks, parallel shafts, one attached to the center of each disk for rotating the same, a casting having two arms and four bearings, two bearings in each arm making two pairs of bearings, one pair for each shaft and one bearing of each pair in each arm, one pair of bearings permanently fixing the alignment of one of said shafts, eccentric sleeves in the other pair of bearings, the other shaft being mounted in said sleeves, a pulley on each shaft for driving the same, said pulleys being located between said arms, a bail connecting said sleeves rigidly together whereby they may be simultaneously rotated to adjust the alignment of said other shaft while maintaining the parallelism of the shafts, said bail passing around said pulleys at a sufficient distance to permit belts to run around said pulleys and within said bail and means independent of said bail for adjusting said shafts longitudinally to regulate the contact between said disks.

In testimony whereof, we have hereunto subscribed our names in the presence of two subscribing witnesses.

REES BEYNON.
JOHN C. HINTZ.

Witnesses:
 CARLTON HILL,
 JAMES M. O'BRIEN.